Oct. 23, 1928.

J. BARTOSIK

FLUSH TANK

Filed Nov. 16, 1927

Inventor
J. Bartosik.

By Lacey & Lacey, Attorneys

Oct. 23, 1928.

J. BARTOSIK 1,688,797

FLUSH TANK

Filed Nov. 16, 1927      3 Sheets-Sheet 2

Inventor

J. Bartosik.

By Lacey & Lacey, Attorneys

Oct. 23, 1928.

J. BARTOSIK 1,688,797

FLUSH TANK

Filed Nov. 16, 1927

Inventor

J. Bartosik;

By Lacey & Lacey, Attorneys

Patented Oct. 23, 1928.

1,688,797

UNITED STATES PATENT OFFICE.

JOSEPH BARTOSIK, OF MONESSEN, PENNSYLVANIA.

FLUSH TANK.

Application filed November 16, 1927. Serial No. 233,637.

The object of this invention is to provide a flushing tank which will be certain in its operation and which will be free of floats, ball valves and other expensive and complicated elements now generally employed in such apparatus. The invention seeks to provide an apparatus of simple and compact form in which a container will be automatically filled after a flushing operation and upon release will be inverted to discharge its contents and automatically held in inverted position until its entire contents have been discharged and then returned to its initial position for refilling. A secondary object of the invention is to mount the container in such a manner that the volume of water used at each operation may be varied so as to conserve the supply and reduce the operating expense where the water is supplied through a metered service. The invention is illustrated in the accompanying drawings and will be hereinafter fully set forth.

Figure 1:
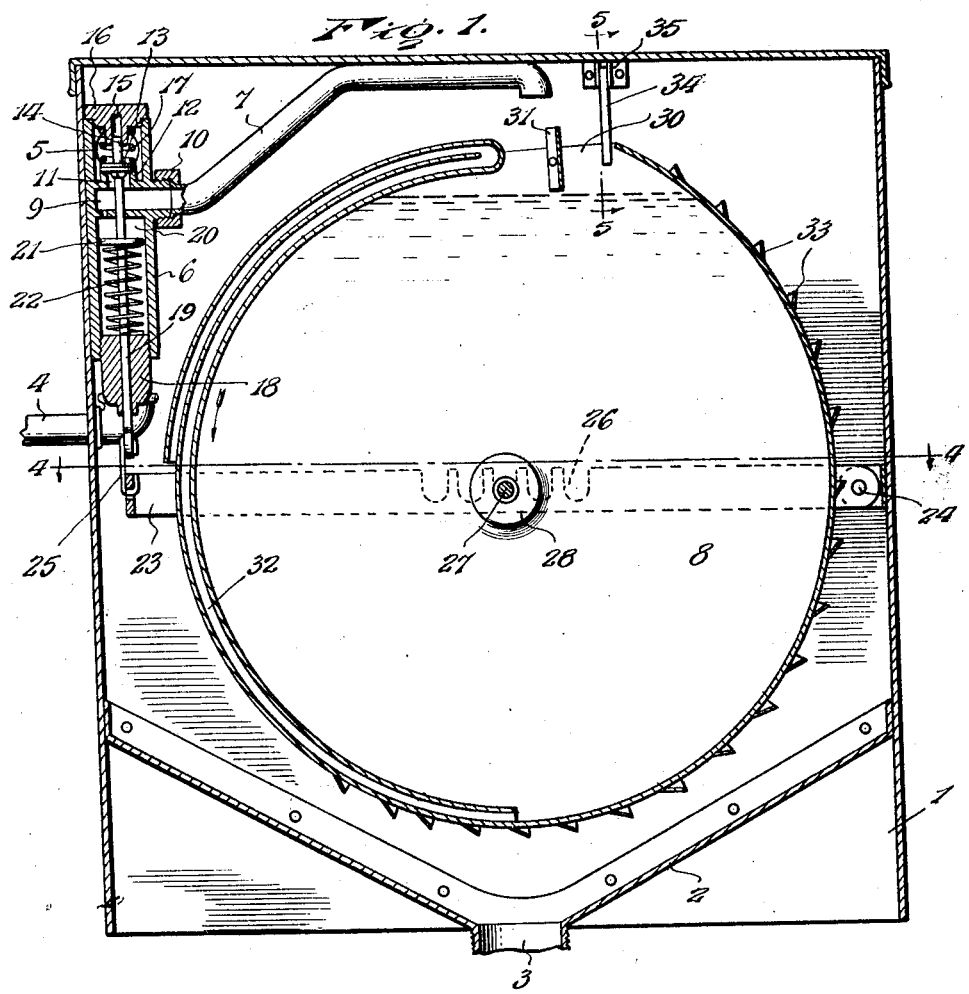
Figure 1 is a vertical longitudinal section of an apparatus embodying the invention showing the container or drum in its filled position prior to a flushing operation.
Figure 4:
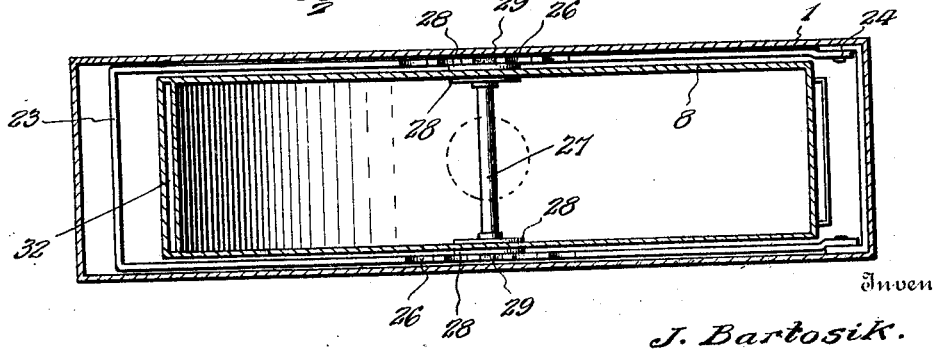
Fig. 4 is a horizontal section on the line 4—4 of Fig. 1.
Figure 2:
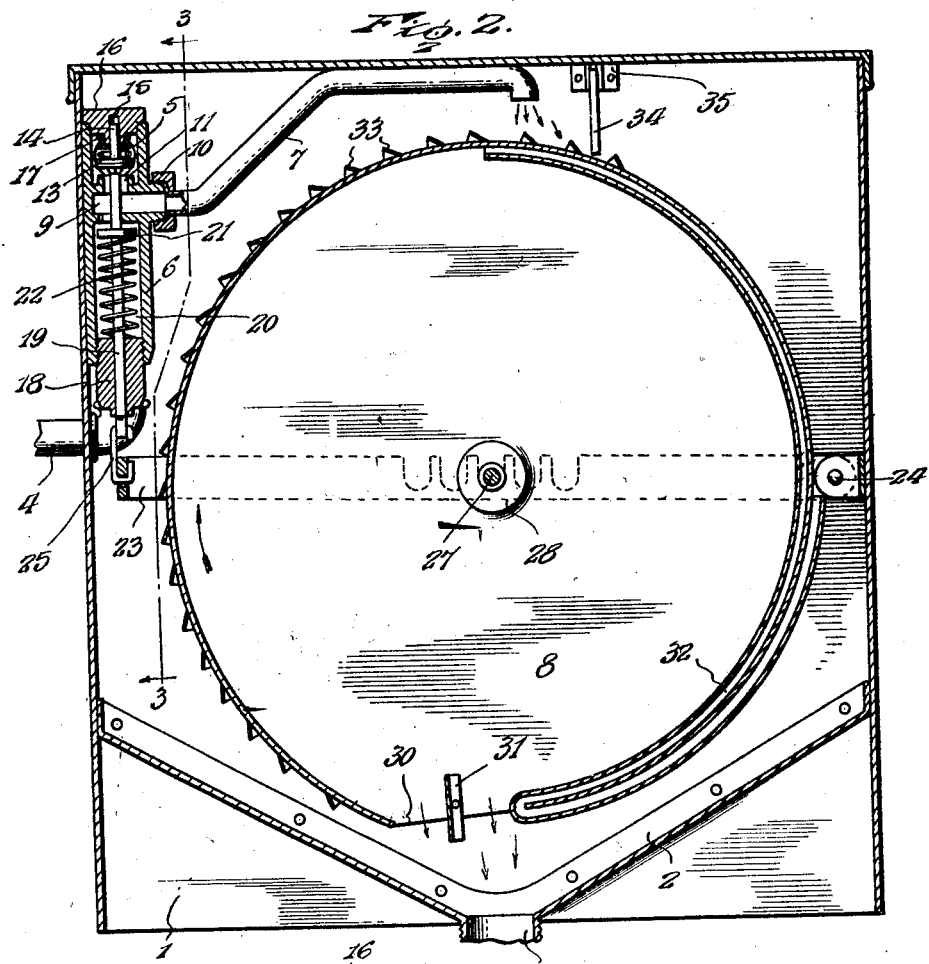
Fig. 2 is a similar view showing the container or drum in its discharging position and about to return to the position shown in Fig. 1.
Figure 3:
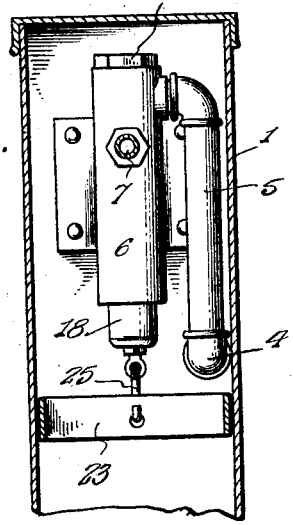
Fig. 3 is a vertical section on the line 3—3 of Fig. 2.

In carrying out the invention, there is provided a housing or tank 1 which may be of any preferred form and is preferably rectangular, this housing or tank being provided with a V-shaped bottom 2 having a central outlet or discharge nozzle 3 which is connected with a sewer or other part to be flushed. The tank or housing 1 may be secured in position in any desired manner and through one end of the tank a supply pipe 4 leads thereinto from any convenient source of supply. The supply pipe after entering the tank extends upwardly at the end of the same, as shown at 5, to communicate with the upper end of a valve casing 6, and from the said casing below the end of the pipe 5 an outlet pipe 7 leads across the top of the tank to a point above the container or drum 8 so as to discharge thereinto. Within the valve casing 6 is a tubular partition 9 which is alined axially with the pipe 7 and is coupled thereto, as shown at 10, whereby the water delivered into the valve casing will be directed into the outlet pipe 7 when the apparatus is operated. In the upper side of the tubular partition 9 is a port 11 around which is a flange or collar 12 forming a seat for a valve 13. The valve is preferably in the form of a disk having a stem 14 rising therefrom and playing in a groove or socket 15 formed in a plug 16 which closes the upper end of the valve casing, a spring 17 being coiled around the stem between the plug and the valve so that by its expansion it tends to keep the valve normally seated and the flow of water thereby cut-off. The lower end of the valve casing is closed by a plug 18 which forms a guide for a push rod 19 extending vertically therethrough and through the chamber 20 in the valve casing above the plug, the upper extremity of the push rod passing through a guide opening provided therefor in the bottom of the tubular partition and abutting the valve 13. An abutment or collar 21 is provided on the push rod within the chamber 20 and an expansion spring 22 is disposed within said chamber between said abutment and the plug 18, as shown, so that this spring tends to hold the push rod in engagement with the valve, it being understood that the spring 22 is stronger than the spring 17 and, consequently, the valve will not be closed through the action of the spring 17 alone. Within the tank, a U-shaped frame or drum support 23 is provided, said frame being pivoted, as shown at 24, within the tank at the end of the same remote from the controlling valve and the free end of this swinging frame or drum support is connected with the lower end of the push rod 19 by an unbending coupling link 25 whereby the rocking movement of the support will be transmitted to the push rod. In the upper edges of the side members of this frame 23 are a series of notches 26 receiving studs or trunnions on the drum or container 8 so that the drum may rock or rotate freely upon the supporting frame. The trunnions may be the ends of an axle member 27 extending centrally through and across the tank and provided adjacent its ends with washers or disks 28 whereby the drum will be reinforced at its center and leakage will be avoided. Rubber bearing rings 29 are fitted on the ends of the axle so that the drum may rock readily when its operation is desired, it being well understood that water is an efficient lubricant for rubber and the use of oils or other agencies is thereby rendered unnecessary. By setting the drum in one or another of the notches 26, it will obviously be supported at a greater or less distance from the pivot of the supporting frame and, therefore, the frame will be caused to rock under the weight of a smaller or larger volume of water within the drum. The inlet opening 30 of the drum is disposed eccentrically with respect to the axle 27, as shown in Fig. 1, and within the said opening is mounted a check plate or rudder 31 which is disposed transversely of the drum and midway the length of the inlet opening. Upon the circumferential wall of the drum, at that side which is nearer the valve when the drum is in its filling or normal position, is provided an air tube or passage 32 which extends half-way around the interior of the drum and approximately one-fourth way round the exterior of the drum, both ends of this passage or tube being open and the passage extending from its inner end to the inlet opening of the drum, then around the edge of the opening and then in the reverse direction along the outer circumference of the drum, as clearly shown in Figs. 1 and 2. Air within the tank above the water level will thus be admitted to the interior of the drum and when the drum is inverted, as shown in Fig. 2, the air entering the drum will prevent the formation of a vacuum and consequently will aid in effecting discharge of the water. Upon the opposite side of the outer surface of the drum are provided a plurality of buckets or blades 33 which are adapted to receive impact of inflowing water from the pipe 7 and thereby aid in returning the drum to its initial position after a discharge.

Figure 5:
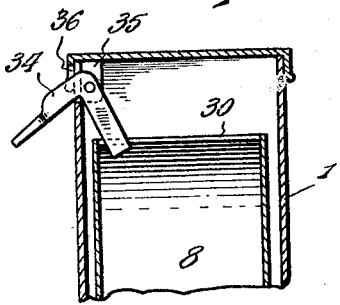
Fig. 5 is a detail transverse section on the line 5—5 of Fig. 1.

A trigger in the form of an angle lever 34 is provided to control the operation of the drum, this trigger being fulcrumed at its angle in a suitable bracket 35 secured upon the wall of the drum at the top thereof with one arm of the trigger extending through an opening 36 provided therefor in the tank and its other arm depending to pass into the opening 30 of the drum into the path of the adjacent edge of said opening, as shown in Figs. 1 and 5.

Assuming the drum to be filled, the valve 13 will be seated and the trigger will be in the position shown in Figs. 1 and 5. The weight of the air passage or vent 32 will overbalance the drum so that it tends to rotate in the direction indicated by the arrow in Fig. 1 but will be held against rotation by the trigger and the frame 23 will be in its lowered position. When it is desired to flush the sewer or other part, the outstanding arm of the trigger is pressed toward the tank thereby swinging the inner arm thereof out of engagement with the drum, as will be understood upon reference to Fig. 5, whereupon the drum will at once rotate in the direction indicated by the arrow in Fig. 1. As the opening 30 of the drum reaches a point below the level of the water therein, the water will begin to discharge and it will flow from the drum faster than it will pass through the discharge nozzle 3 of the tank, the result being an accumulation of water in the bottom of the tank so that as the drum approaches complete inversion the check plate or rudder 31 will strike the body of accumulated water in the tank and will check the rocking of the drum. When the drum reaches complete inversion, the check plate will be acted upon on both sides by the outflowing water so that the drum will be held in the position shown in Fig. 2 and the air in the upper portion of the tank will flow through the air passage 32 to reach the interior of the drum above the water therein so as to prevent the formation of a vacuum and consequently cause all the water to discharge. As the drum is relieved of the weight of the contained water, the spring 22 will expand and the push rod 19 will be carried upwardly so as to unseat the valve 13 and permit another charge of water to pass to and through the outlet pipe 7. This inflowing water will issue from the end of the pipe 7 and strike upon the drum against the blades or buckets 33 so that the drum will be set in rotation in the direction indicated by the arrow in Fig. 2 to return to its initial filling position. At this time, the inner end of the trigger 34 will be resting upon the circumference of the drum so that it will automatically drop into the opening 30 of the drum when said opening reaches the high point shown in Fig. 1 The water will continue to flow from the pipe 7 and will now pass through the opening 30 to be caught and held in the drum and it will continue to flow and to fill the drum until the weight of the drum and the water therein overcomes the tension of the spring 22, whereupon the frame 23 will rock downwardly and the cut-off valve will then close under the action of the spring 17. The apparatus will now be in position and in condition for a second flushing operation.

Figure 6:
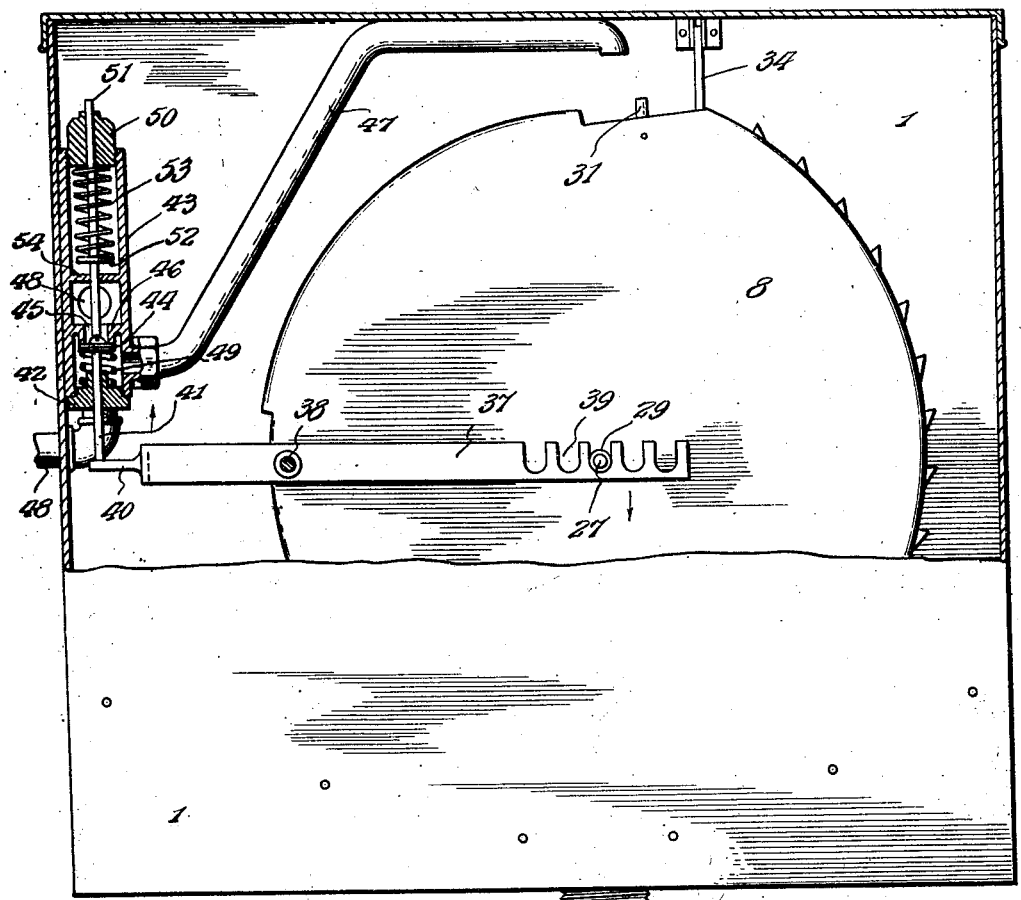
Fig. 6 is a view similar to Fig. 1 but showing a slight modification.
Figure 7:
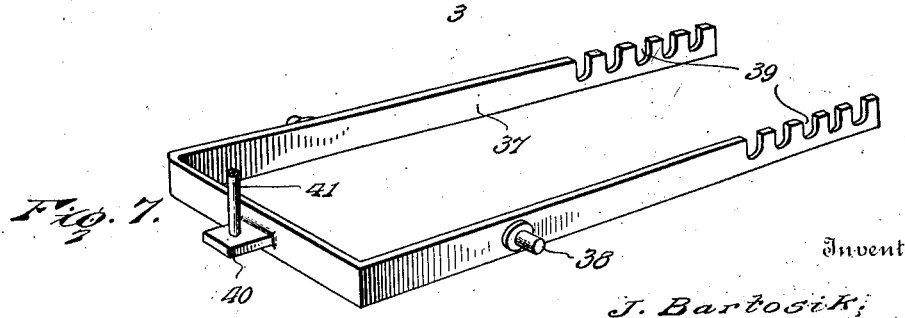
Fig. 7 is a detail perspective view of the drum support shown in Fig. 6.

In Figs. 6 and 7, I have shown a slight modification of the invention in which the same drum 8 is employed but, instead of having the supporting frame 23 which is pivoted at one end within the tank, I employ a shorter supporting frame 37 which is provided between its ends with trunnions or studs 38 adapted to be pivotally supported in the sides of the tank. This frame 37 is provided with notches 39 corresponding in all respects to the notches 26 of the first described supporting frame, except that they are located at the inner end of the frame instead of at the center thereof, the drum, however, being supported in the notches in exactly the same manner as the drum is supported in the notches 26. At the valve end of the frame 37, there is a central lug or tongue 40 upon which rests the lower end of the valve stem 41. This stem passes upwardly through a plug 42 in the lower end of the valve casing 43 and at its upper end carries a valve 44 seating over a port 45 in a tubular partition 46 extending across the valve casing above the outlet pipe 47 whereby the water is discharged into the drum. The inlet pipe 48 enters the valve casing above the port 45 and the valve is held to its seat by a spring 49. The upper end of the valve casing is closed by a plug 50 and a push rod 51 passes centrally through this plug and through an opening provided therefor in the partition 54 to rest upon the valve. An abutment 52 is provided upon the push rod 51 and a spring 53 is coiled around the push rod between the plug 50 and said abutment and tends to unseat the valve. The operation of this arrangement is the same as the previously described embodiment, except that the weight of the drum and the water therein closes the valve by pushing upwardly upon the valve stem, whereas in the first described form the action was a pull upon the push rod.

Having thus described the invention, I claim:

1. A flushing apparatus comprising a tank, a pivotally mounted frame within the tank, an overbalanced rotatable drum carried by said frame, valve-controlled means for filling the drum, means controlled by the pivoted frame for governing the valve-controlled means, and means whereby rotation of the drum will be prevented.

2. A flushing apparatus comprising a tank having a discharge outlet in its bottom, an overbalanced rotatable drum mounted within the tank and having an opening in its circumference, eccentrically disposed means for supplying water to the drum, means whereby the supply of water will be cut off when the drum is filled and caused to flow when the drum is empty, and buckets on the drum presented to the water-supplying means when the drum is inverted whereby inflowing water will return the drum to filling position.

3. Flushing apparatus comprising a tank having a discharge outlet in its bottom, a drum having an opening in its circumference whereby the drum may be filled in one position and will discharge when inverted, an air passage upon one circumferential side of the drum whereby the drum will be overbalanced and will tend to move to discharging position and the formation of a vacuum within the drum will be prevented, and buckets on the opposite circumferential side of the drum adapted to receive impact from inflowing water to return the drum to filling position.

4. Flushing apparatus comprising a tank, a drum rotatably mounted in the tank and having an opening at one point in its circumference, means for filling the tank, means whereby the tank will be overbalanced and will tend to rotate to discharging position, and a trigger mounted in the tank and having one end normally projecting into the opening in the drum to prevent rotation of the drum.

5. Flushing apparatus comprising a tank, a pivotally mounted frame within the tank, a drum carried by said frame and adjustable along the same, a water pipe arranged to deliver water into the drum to fill the same, a valve controlling the flow through said pipe, and means whereby when the drum is filled the pivoted frame will be rocked and will close the valve.

6. Flushing apparatus comprising a tank, a water pipe arranged to deliver water within the tank, a drum mounted within the tank to receive the water from said pipe, a valve controlling the flow through said pipe, a push rod engaging the valve and tending constantly to open the same, and connections between the drum and the push rod whereby when the drum is filled the valve will be closed.

7. A flushing apparatus comprising a tank having a discharge outlet in its bottom, a rotatable drum mounted within the tank and having an opening in its circumference, means for supplying water to the drum through said opening, means for effecting rotation of the drum to discharge water through said opening, and a device in the opening in the drum to check rotation of the drum when the opening therein is alined with the outlet of the tank.

In testimony whereof I affix my signature.

JOSEPH BARTOSIK. [L. S.]